United States Patent Office 3,464,724
Patented Sept. 2, 1969

3,464,724
DEVICE FOR INTEGRALLY SECURING A PLURALITY OF CONTROLLING APPARATUS CASINGS TOGETHER AS A UNIT
Teizo Fujita, 34 Tezukayama-Naka-3-chome, Sumiyoshi-ku, Osaka, Japan
Filed Feb. 26, 1968, Ser. No. 708,007
Claims priority, application Japan, Aug. 4, 1967, 42/50,090
Int. Cl. F16b 5/00
U.S. Cl. 287—189.36                    2 Claims

ABSTRACT OF THE DISCLOSURE

A device for integrally securing a plurality of controlling apparatus casings having substantially polygon-shaped cross section to a support structure together as a unit, said device comprising a connecting member which has one end thereof so shaped as to engage outwardly extending and depending flanges of the casings at the corners adjacent to the center of assembly of these casings by extending into recesses behind the depending portions of the flanges of the adjacent casings and clamping members operably mounted on each casing and engageable with the other end of the connecting member to force the connecting member against the end faces of the flanges of the casings.

---

This invention relates to a device for integrally securing a plurality of controlling apparatus casings having substantially polygon-shaped cross section together as a unit.

Heretofore, in order to secure a plurality of casings containing electrical parts on a support structure such, for example, as a panel, each casing has been separately mounted by being inserted into its own opening made in the support structure and clamped on the structure. For this purpose, a plurality of openings must be prepared in the support structure and much labor was spent for the above work.

Moreover, since the casings were mounted with some gaps therebetween, a large mounting area was required.

SUMMARY OF THE INVENTION

An object of the present invention is to overcome the aforementioned disadvantages by providing a device for integrally mounting a plurality of casings together as a unit on a support structure by means of a connecting member and a plurality of clamping members which are also available in separately mounting each of said casings on a support structure.

The present invention contemplates the provision of novel and useful means which can effectively and conveniently be used for assembling a plurality of apparatus casings having a substantially polygon-shaped cross section which mount therein controlling instruments such, for example, as timers, switches, pilot lights, or the like and integrally securing these controlling apparatus casings to a support structure such as a panel. It is the primary object of the present invention to provide a device of the above character which is of simple structure and can easily be handled for securing a plurality of such apparatus casings together as a unit.

BRIEF DESCRIPTION OF THE DRAWINGS

Referring to FIGS. 1 and 2, there are shown a plurality of controlling apparatus casings 1 having substantially square-shaped cross section which are adapted to mount therein a suitable number of appliances such, for example, as timers, switches, pilot lights and the like and each of which consists of an upper body 1a and a lower body 1b separably connected with each other. Recesses 2 are provided in the lower side wall portions adjacent to the four corners of each of the upper bodies 1a, and each recess 2 which is defined by an upper wall 2a, a lower wall 2b being a part of the upper surface of the lower body 1b, a side wall 2c and a side wall 2d has a substantially triangular cross section. A threaded rod or screw 3 extends freely through the upper wall 2a and the lower wall 2b of each recess 2. A substantially L-shaped clamping member 4 having a horizontal portion 4a and an upstanding portion 4b is in threaded engagement with the screw 3 so that the clamping member 4 is vertically movable in each recess 2 when the screw 3 is rotated in either direction. The threaded engagement between the clamping member 4 and the screw 3 is provided by a curled and internally threaded end of the horizontal portion 4a of the clamping member 4 engaging the thread of the screw 3. The upper body 1a of the casing 1 has an open upper end and an outwardly extending and depending peripheral flange 5 surrounding the opening. The clamping member 4 which is movable in the axial direction of the screw 3 in the recess 2 is so arranged that the upstanding portion 4b thereof rotates to protrude outwardly of the upper body 1a as the clamping member 4 is rotated about the screw 3 and moves to a position at which the top end of the upstanding portion 4b is opposed by the end face of the depending portion of the flange 5. However, the upstanding portion 4b of the clamping member 4 can normally bodily be accommodated in the recess 2 as shown by dash-and-dot lines in FIG. 1.

Figure 1:
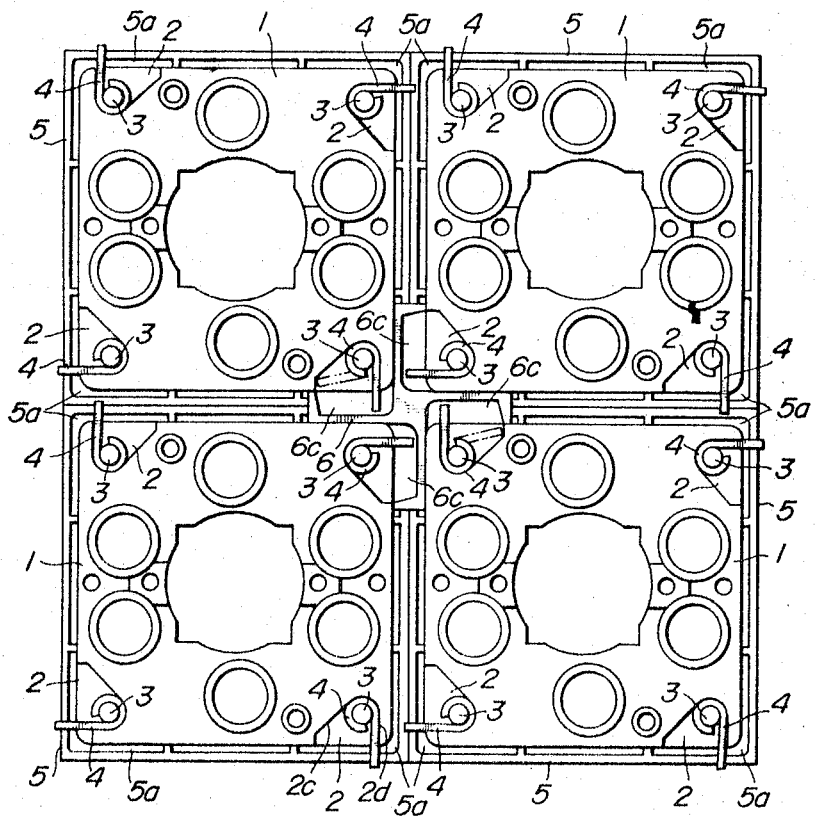
FIG. 1 is a bottom view of a plurality of controlling apparatus casings having substantially square-shaped cross section which are collectively integrally secured together by the device embodying the present invention, with a part of each casing removed to clearly show the assembled state of the casings.
Figure 2:
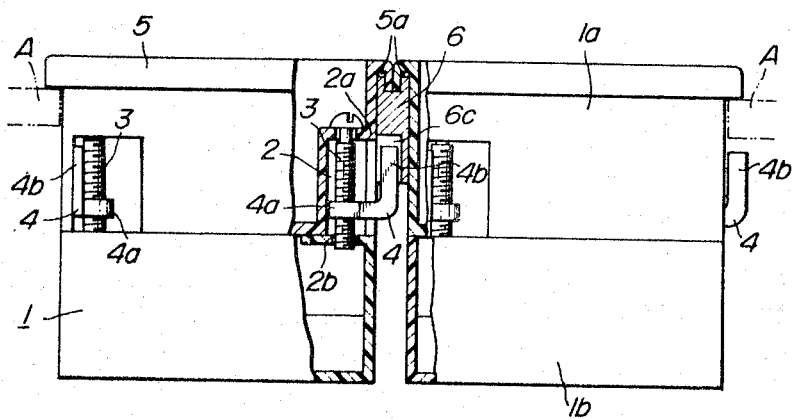
FIG. 2 is a fragmentarily sectional side elevational view of the assembly shown in FIG. 1.

The controlling apparatus casing 1 having such a structure can singly be mounted on a support structure such, for example, as a panel A as shown in FIG. 2. To deal with the single mounting of the appliance container casing 1 on the panel A, the panel A is provided with a mounting opening which can snugly receive therein the body portion of the casing 1. The casing 1 is inserted into the opening from the top side of the panel A until the end face of the depending portion of the peripheral flange 5 rests on the supporting surface of the panel A. Then, a tool such, for example, as a screw driver may be inserted into the open end of the casing 1 to drive each of the screws 3 in a predetermined direction. As the screw 3 is so rotated, the clamping member 4 is also rotated until finally the upstanding portion 4b protrudes from the recess 2 and is held in such a position by being abutted by the side wall 2d of the recess 2 as shown in FIG. 1. Further rotation of the screw 3 causes the clamping member 4 to move upwardly until the top end of the upstanding portion 4b bears against the lower surface of the panel A and forces the end face of the depending portion of the flange 5 against the supporting surface of the panel A to thereby firmly secure the casing 1 to the panel A.

The screw 3 may merely be rotated in a direction opposite to the above when it is desired to dismount the casing 1 from the panel A. In this case, the clamping member 4 moves downwardly as the screw 3 is rotated, and the pressure exerted by the top end of the upstanding portion 4b on the panel A is thereby released. As the screw 3 is further rotated, the top end of the upstanding portion 4b of the clamping member 4 moves downwardly to a position beneath the top wall 2a of the recess 2 formed in the side wall of the upper body 1a of the casing 1, and the clamping member 4 is rotated into the recess 2 to be bodily received in the recess 2. It is thus possible to remove the casing 1 from the receiving opening of the panel A.

Figure 3:
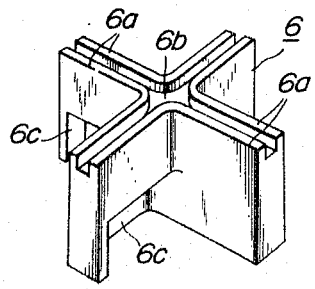
FIG. 3 is an enlarged perspective view of a connecting member having a generally cross-shaped cross section employed in the device according to the present invention.

The present invention provides an effective and convenient means which is useful in a case in which it is desired to mount on a support structure a plurality of controlling apparatus casings which are adapted to be mounted on a panel in the manner described above. In accordance with the present invention, the desired collective mounting of a plurality of such casings 1 can be realized by a connecting member 6 of a shape as shown in FIG. 3. The connecting member 6 has a generally cross-shaped cross section and has four substantially L-shaped ridges 6a formed on the peripheral edges of its top surface so as to define therebetween a cross-shaped groove 6b. The outwardly extending and depending flange 5 of the casing 1 defines a recess 5a along the side faces of the casing 1 as shown in FIG. 2 so that one of the L-shaped ridges 6a can snugly be received in the recess 5a with the end face of the depending portion of the flange 5 bearing against the surface of the groove 6b. It will be understood that, by use of a single connecting member 6 of such a structure, four controlling apparatus casings 1 can integrally be assembled together as shown in FIG. 1, in which case the adjacent L-shaped ridges 6a of the connecting member 6 tightly fit in the recesses 5a formed behind the depending portions of the flanges 5 of the adjacent casings 1. Then, the related one of the clamping members 4 on each casing 1 is urged upwardly until the top end of the upstanding portion 4b bears against the corresponding portion of the bottom face of the connecting member 6 to ensure secure fastening of the four casings 1 as a unit.

Figure 4:
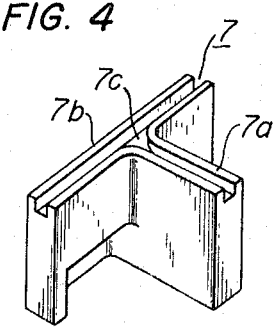
FIG. 4 is a view similar to FIG. 3 illustrating a modified form of connecting member having a generally T-shaped cross section.

As will be apparent from the foregoing description, three controlling apparatus casings can integrally be assembled together as a unit by use of a single connecting member 7 having a substantially T-shaped cross section and having two substantially L-shaped ridges 7a and one straight ridge 7b formed on the peripheral edges of its surface so as to define therebetween T-shaped groove 7c as shown in FIG. 4.

The bottom face of the connecting member 6 may merely be flat provided that the height of the connecting member 6 is smaller than the approximate length of the vertical distance between the top face of the flange 5 and the top face of the upper wall 2a of the recess 2. However, the connecting member 6 may preferably have a height which is somewhat larger than the above-mentioned length in order to ensure the positional stability of the adjacent casings, and for this reason, a cutout 6c as shown in FIG. 3 may be provided at a position which corresponds to the position of the recess 2 in the side wall of each casing 1 so that the upstanding portion 4b of the clamping member 4 can be received in the cutout 6c when the clamping member 4 protrudes from the recess 2. The provision of the cutout 6c is so effective that, as the clamping member 4 is rotated by the rotation of the screw 3, the upstanding portion 4b of the clamping member 4 protrudes from the recess 2 and is received in the space defined by the cutout 6c of the connecting member 6, the subsequent upward movement of the clamping member 4 resulting in abutment of the top end of the upstanding portion 4b with the top face of the cutout 6c of the connecting member 6 thereby pressing the connecting member 6 against the end face of the depending portion of the flange 5 of the casing 1. In this manner, the adjacent casings 1 can be securely integrally connected together.

The above description has referred to an embodiment of the present invention in which the controlling apparatus casing 1 is comprised of upper and lower bodies in order to facilitate the formation of the recesses 2 in the side walls and the mounting of the screws 3, but it will be understood that these upper and lower bodies may be nonseparably formed to provide a one-body casing. Further, the controlling apparatus casing 1 referred to above is adapted to mount therein pilot lights or switches which may include a suitable number of electric bulbs and sockets housed in the casing 1, an illuminating lens assembly fixedly or removably mounted in the upper open end of the casing 1, and a transformer or on-off switches disposed in the lower part of the casing 1. However, it will be understood that conventional push button switches and any other unit instruments may be mounted in the casing 1.

In accordance with the present invention, only one connecting member can sufficiently integrally secure a plurality of, say, four controlling apparatus casings together as shown in FIG. 1. In mounting the casing assembly comprising the integrally secured four casings on a support structure, a mounting opening having such an area which is sufficient to snugly receive therein the casing assembly may be provided in the support structure, the casing assembly being then mounted in the opening with the end faces of the depending portions of the peripheral flanges of the casing assembly borne against the supporting surface of the support structure, and eight clamping members may be manipulated to force and secure the casing assembly to the support structure in a manner as shown in FIG. 1.

It will be appreciated that, in accordance with the present invention, a plurality of controlling apparatus casings can be integrally secured together by a single connecting member in the manner described above, and the integrally secured casing assembly can then be mounted on a support structure as a unit.

The securing device according to the invention is remarkably effective and convenient in practical applications by virtue of the following advantages:

(1) The device is simple in structure and can easily be handled for the securing purpose.

(2) Despite the use of the unique connecting member, any increase in the overall dimensions of the integrally secured casing assembly, that is, the installation area of the casing assembly does not result.

(3) The connecting member and the clamping members do not in any way impair the beautiful appearance of a support structure such, for example, as a panel because they are concealed in the back of the panel and cannot be seen from the front side of the panel.

I claim:

1. A device for integrally mounting four substantially rectangularly shaped casings for control apparatus together as an assembled unit on a supporting means, each of said casings having four upstanding side walls and a flange at the upper peripheral edge thereof extending outwardly and downwardly so that when the casings are assembled together in said assembled unit, the flanges of adjacent casings contact each other to define a space between the side walls of adjacent casings beneath the flanges thereof; said device comprising:

a substantially cross-shaped connecting member having four substantially L-shaped ridges formed at the peripheral edges of the upper surface thereof, said ridges defining a substantially cross-shaped groove therebetween, said cross-shaped groove being engageable with the flanges of said four casings and said connecting member contacting the side walls of said four casings, when said connecting member is positioned between said four casings at the center of said assembled unit; and at least one substantially L-shaped clamping member carried by each of said casings, each of said clamping members being disposed in a recess formed in one of the side walls of the associated casing adjacent an end thereof, each of said recesses being defined by an upper, lower and plurality of side walls, each of said clamping members having a substantially horizontal base portion and an upstanding clamping portion, said base portion being threadably engaged with a screw rod extending through and supported by the upper and lower walls of said recess, said screw rod being rotationally actuatable from within the associated casing, the upper end of said clamping portion being directed toward the flange of the associated casing, said clamping member being normally housed within said recess, and upon rotation of said screw rod in a predetermined direction being rotated with said screw rod until said clamping portion projects outside the side wall of the associated casing beneath the flange thereof and abuts one of said recess side walls, and thereafter being moved upwardly toward the flange of the associated casing so that the upper end of said clamping portion is engageable with the lower end of said connecting member to urge the upper end of said connecting member against the flanges of said four casings for securing the casings together when the casings are assembled together in said assembled unit.

2. A device for integrally mounting three substantially rectangular casings for control apparatus together as an assembled unit on a supporting means, each of said casings having four upstanding side walls and a flange at the upper peripheral edge thereof extending outwardly and downwardly so that when the casings are assembled together in said assembled unit, the flanges of adjacent casings contact each other to define a space between the side walls of adjacent casings beneath the flanges thereof, said device comprising:

a substantially T-shaped connecting member having two substantially L-shaped ridges and one substantially straight ridge formed at the peripheral edges of the upper surface thereof, said ridges defining a substantially T-shaped groove therebetween, said T-shaped groove being engageable with the flanges of said three casings and said connecting member contacting the side walls of said three casings when said connecting member is positioned between said three casings at the center of said assembled unit; and at least one substantially L-shaped clamping member carried by each of said casings, each of said clamping members being disposed in a recess formed in one of the side walls of the associated casing adjacent an end thereof, each of said recesses being defined by an upper, lower and plurality of side walls, each of said clamping members having a substantially horizontal base portion and an upstanding clamping portion, said base portion being threadably engaged with a screw rod extending through and supported by the upper and lower walls of said recess, said screw rod being rotationally actuatable from within the associated casing, the upper end of said clamping portion being directed toward the flange of the associated casing, said clamping member being normally housed within said recess, and upon rotation of said screw rod in a predetermined direction being rotated with said screw rod until said clamping portion projects outside the side wall of the associated casing beneath the flange thereof and abuts one of said recess side walls, and thereafter being moved upwardly toward the flange of the associated casing so that the upper end of said clamping portion is engageable with the lower end of said connecting member to urge the upper end of said connecting member against the flanges of said three casings for securing the casings together when the casings are assembled together in said assembled unit.

References Cited

UNITED STATES PATENTS 2,725,127 11/1955 Barrett et al. _____ 52—484 X
3,014,565 12/1961 Puetz.

FOREIGN PATENTS 1,086,377 10/1967 Great Britain.

RAMON S. BRITTS, Primary Examiner

U.S. Cl. X.R.

174—50